US006827390B2

(12) United States Patent
Zummallen et al.

(10) Patent No.: US 6,827,390 B2
(45) Date of Patent: Dec. 7, 2004

(54) C-PILLAR AND REAR DOOR HINGE STRUCTURE FOR VEHICLES LACKING A B-PILLAR

(75) Inventors: Robert G. Zummallen, East Liberty, OH (US); Shawn L. Tarr, Dublin, OH (US); Thomas H. Croyle, Milford Center, OH (US); Kenichi Kitayama, Dublin, OH (US); Matthew Plett, Worthington, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/397,727

(22) Filed: Mar. 26, 2003

(65) Prior Publication Data

US 2004/0189053 A1 Sep. 30, 2004

(51) Int. Cl.[7] .................................................. B60J 1/08
(52) U.S. Cl. ............. 296/146.11; 296/202; 296/193.06; 296/146.09
(58) Field of Search ........................ 296/187.12, 190.11, 296/193.05, 202, 203.02, 146.1, 146.5, 146.6, 146.9, 146.11, 193.06; 52/735.1

(56) References Cited

U.S. PATENT DOCUMENTS

| | | | |
|---|---|---|---|
| 1,652,902 A | * 12/1927 | Ledwinka | .................... 296/202 |
| 4,304,434 A | 12/1981 | Suzuki et al. | |
| 4,930,836 A | 6/1990 | Grinn | |
| 5,398,989 A | 3/1995 | Winter et al. | |
| 5,491,875 A | * 2/1996 | Siladke et al. | ................. 16/346 |
| 5,765,895 A | 6/1998 | Rose et al. | |
| 5,855,407 A | 1/1999 | Fukuda | |
| 6,053,561 A | * 4/2000 | Hojnowski et al. | .... 296/146.11 |
| 6,059,352 A | * 5/2000 | Heldt et al. | .............. 296/146.6 |
| 6,086,141 A | 7/2000 | Masuda et al. | |
| 6,267,437 B1 | 7/2001 | Morsch et al. | |
| 6,267,438 B1 | 7/2001 | Jonsson | |
| 6,609,748 B1 | * 8/2003 | Azzouz et al. | ........... 296/146.1 |
| 6,659,537 B2 | * 12/2003 | Moriyama et al. | ........ 296/146.6 |
| 2003/0006625 A1 | * 1/2003 | Moriyama et al. | ........ 296/146.6 |
| 2003/0230910 A1 | * 12/2003 | Azzouz et al. | ......... 296/146.11 |

FOREIGN PATENT DOCUMENTS

EP     1 264 757 A2     12/2002

* cited by examiner

*Primary Examiner*—Patricia L. Engle
(74) *Attorney, Agent, or Firm*—Rankin, Hill, Porter & Clark LLP

(57) ABSTRACT

A C-pillar assembly for a vehicle that lacks a B-pillar, the C-pillar assembly including an inner reinforcement member, an outer reinforcement member, upper and lower hinge assemblies, and an outer garnish member. The outer reinforcement member is disposed over the inner reinforcement member. The inner and outer reinforcement members are secured to one another so as to define a C-pillar having, in cross section, a generally box-like shape. The outer reinforcement has an upper mounting location to which the upper hinge assembly is secured and a lower mounting location to which the lower hinge assembly is secured. A portion of the lower hinge assembly is disposed within a hinge pocket formed in the outer reinforcement member. The outer garnish member is secured to the outer reinforcement member and defines a slotted opening through which the lower hinge assembly extends.

24 Claims, 7 Drawing Sheets

C-PILLAR AND REAR DOOR HINGE STRUCTURE FOR VEHICLES LACKING A B-PILLAR

BACKGROUND OF THE INVENTION

1. Field of the Invention

The present invention is generally directed toward vehicle structures and, more particularly, toward C-pillar and hinge structures for vehicles.

2. Description of Related Art

In conventional vehicles having a front door and a rear door on each side thereof, the front door is pivotally secured about its forward end to the vehicle body or A-pillar whereas the rear door is pivotally secured about its forward end to the vehicle body or B-pillar. Due to the presence of the B-pillar, the rearward edge of the front door and the forward edge of the rear door are effectively linked to the vehicle body and, as such, are considered to be able to effectively resist side impacts.

In four door vehicles lacking a B-pillar, the front door is pivotally secured about its forward end to the vehicle body whereas the rear door is pivotally secured about its rearward end to the vehicle body. In such constructions, the rearward end of the front door is sealed to the forward end of the rear door. Further, it is desirable to build-up or stiffen the doors to increase their inherent stiffness so as to be better able to resist lateral deformation in the event of a side impact.

Accordingly, the front and rear doors may be relatively heavier in vehicles lacking a B-pillar as compared to vehicles that include a B-pillar. Moreover, for rear doors in a vehicle lacking a B-pillar, a significant portion of the increased mass of the door is provided at the forward end of the rear door (i.e., at the portion overlapping the rearward end of the front door) in order to help compensate for the lack of the B-pillar, and to help stiffen the interface between the front and rear doors.

Due to the increased weight of the rear door, there exists a need in the art for an improved C-pillar structure that is better able to bear the increased weight of the rear door. Moreover, it is desirable to provide a rear door that may be opened fully (i.e., 90°) so as to provide better access to the interior of the vehicle. Therefore, there exists a need in the art for a rear door hinge assembly for a vehicle lacking a B-pillar that permits the rear door to open fully.

SUMMARY OF THE INVENTION

The present invention is directed toward an improved C-pillar assembly for a vehicle lacking a B-pillar. The present invention is further directed toward a rear door hinge assembly that pivotally secures the rear door to the C-pillar and permits the rear door to open fully.

In accordance with the present invention, a C-pillar assembly for a vehicle includes an inner reinforcement member and an outer reinforcement member. Each of the inner and outer reinforcement members extends between a roof rail and a rocker panel of the vehicle so as to integrally link the roof rail to the rocker panel.

In further accordance with the present invention, the outer reinforcement member is disposed over the inner reinforcement member. The inner and outer reinforcement members are secured to one another such so as to define a C-pillar having, in cross section, a generally box-like shape along at least a portion of a length of the C-pillar.

In further accordance with the present invention, the outer reinforcement member provides an upper mounting location for an upper hinge assembly and a lower mounting location for a lower hinge assembly. The upper hinge assembly includes a first upper hinge bracket, which is secured to the outer reinforcement member at the upper mounting location, and a second upper hinge bracket, which is secured to a rear door of the vehicle. The lower hinge assembly includes a first lower hinge bracket, which is secured to the outer reinforcement member at the lower mounting location, and a second lower hinge bracket that is secured to the lower door.

In further accordance with the present invention, the outer reinforcement member defines a recess and has upper and lower brackets secured thereto. The upper and lower brackets cooperate with the outer reinforcement member to define a hinge pocket in which the second lower hinge bracket is disposed. An outer garnish member is disposed over the hinge pocket and defines an opening through which the second lower hinge bracket extends.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
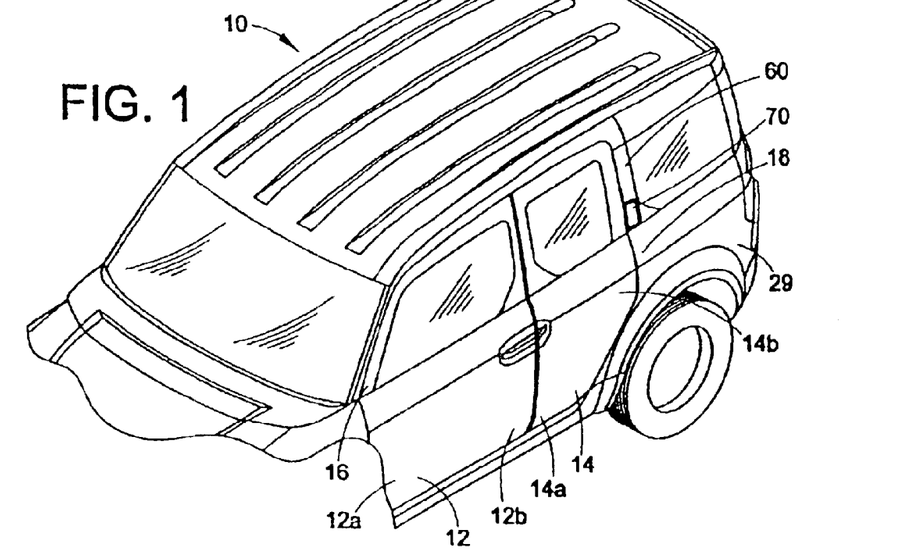
FIG. 1 is a partial perspective view of a vehicle incorporating the C-pillar and rear door hinge assembly of the present invention.

With reference to FIG. 1, a vehicle 10 incorporating the hook and catch assembly according to the present invention is illustrated. The vehicle 10 includes a front door 12 and a rear door 14. The front door 12 is pivotally secured at its forward end 12a to the vehicle body at or adjacent the A-pillar 16, whereas the rear door 14 is pivotally secured at its rearward end 14b to the vehicle body at or adjacent the C-pillar 18. Accordingly, the front and rear doors 12, 14 overlap such that the rearward end 12b of the front door 12 is sealingly secured to the forward end 14a of the rear door 14. As such, the vehicle 10 does not include a conventional B-pillar and, accordingly, a relatively enlarged access opening is provided when the front and rear doors 12, 14 are in the open position. For further information on the aforementioned doors and door sealing structure, reference should be made to U.S. patent application Ser. No. 10/278,337, filed Oct. 23, 2002, the disclosure of which is expressly incorporated herein in its entirety.

As illustrated with reference to FIGS. 1 and 2, the rear door 14 is pivotally secured to the vehicle body (C-pillar 18)

by a lower hinge assembly 20 and an upper hinge assembly 22. The upper hinge assembly 22 is secured to the C-pillar 18 at a location that is relatively rearward or behind the rear door 14. The lower hinge assembly 20 is disposed within a recess or hinge pocket 26 formed within the C-pillar 18, which is covered by an outer garnish member 28. The outer garnish member 28 includes an opening through which door-mounted portions of the lower hinge assembly 20 extend, as will be discussed further hereinafter.

At a top of the rear door opening, the roof rail (not shown) is covered by a roof garnish 30, while at a bottom of the rear door opening, the rocker panel is at least partially covered by a rocker panel garnish 32. An outer skin or body panel 34 is disposed over the C-pillar 18 at locations that are not covered by the outer garnish member 28 (i.e., above the lower hinge assembly 20) so as to provide a smooth and aesthetically pleasing appearance at these locations. A lower body panel garnish 29 extends over the lower rear portion of the vehicle 10, as illustrated. The location and construction of the upper and lower hinge assemblies 20, 22 cooperate to permit the rear door 14 to be opened fully or generally perpendicular to the vehicle body, so as to provide a relatively enlarged opening for access into the vehicle interior.

Figure 2:
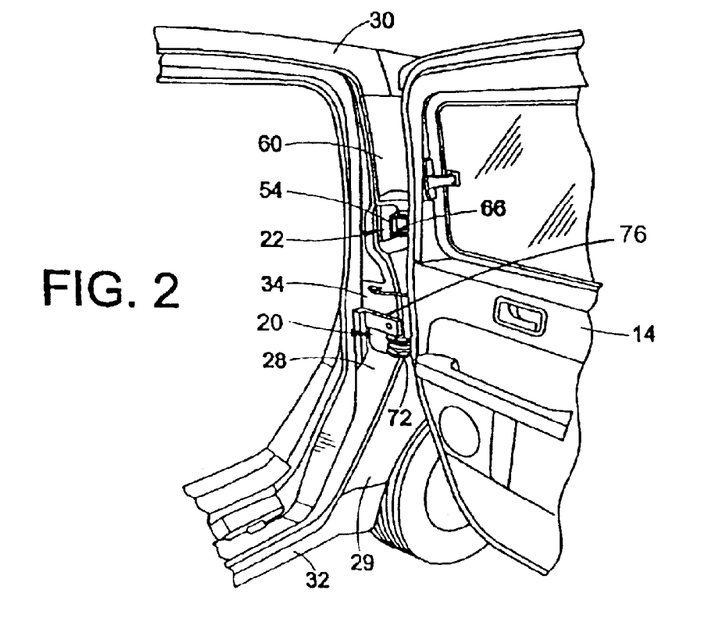
FIG. 2 is an enlarged perspective view of the vehicle of FIG. 1, showing the rear door in an open position.
Figure 3:
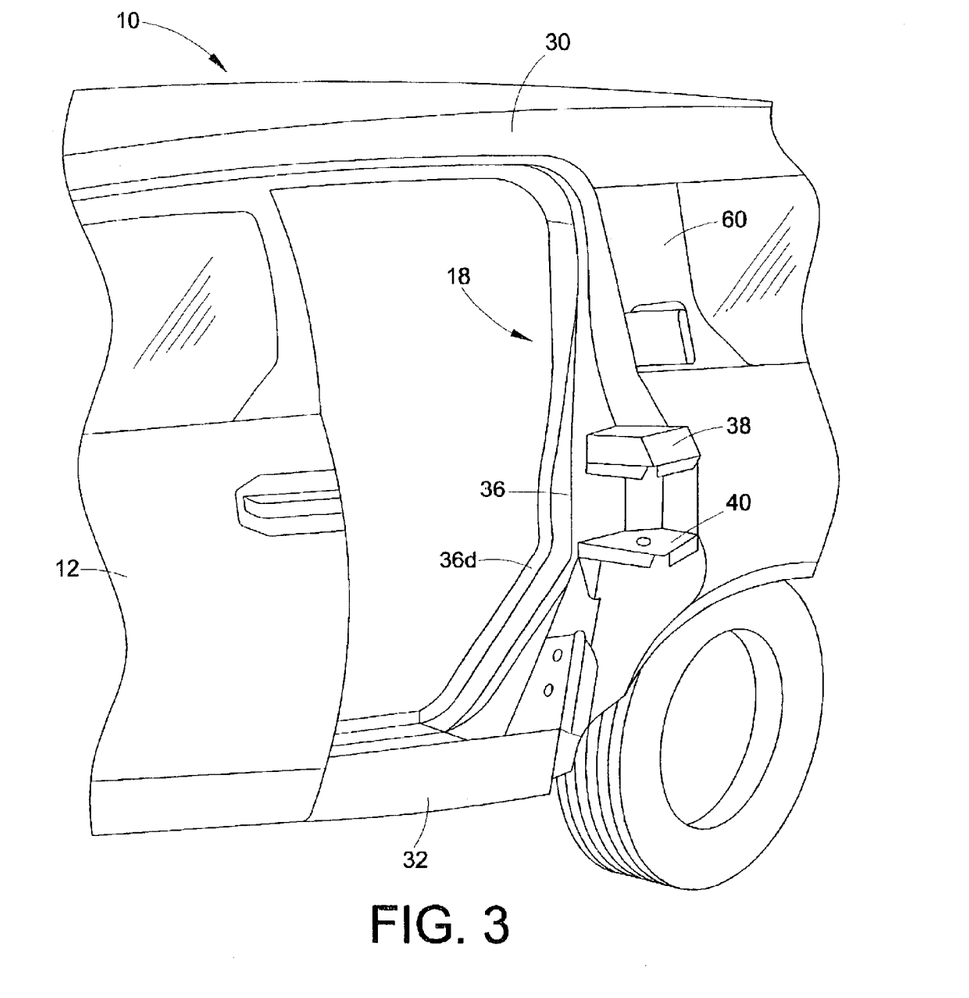
FIG. 3 is an enlarged perspective view similar to FIG. 2, but with the rear door, an outer garnish member, and portions of the outer body panel removed.

FIG. 3 illustrates the vehicle with the rear door 14, the outer garnish member 28, and portions of the outer body panel 34 removed for purposes of clarity. As such, an outer reinforcement member 36, which defines mounting locations or supports for the upper and lower hinge assemblies 20, 22, is visible. The outer reinforcement member 36 integrally includes upper and lower brackets 38, 40 that cooperate to define the hinge pocket 26, which is normally covered by the outer garnish member 28 (FIG. 2). The outer reinforcement member 36 cooperates with an inner reinforcement member 42 to form the C-pillar 18, as will be discussed more fully hereinafter With reference to FIG. 4, the inner reinforcement member 42 is illustrated. The inner reinforcement member 42 is preferably formed from sheet metal, and comprises an upper portion 42a and a lower portion 42b that are integrally secured to one another, such as by welding. Naturally, the inner reinforcement member 42 may be formed in one piece without departing from the scope and spirit of the present invention. However, due to the complex shape and numerous bends, cut-outs, etc. provided by the inner reinforcement member 42, forming same in two or more pieces is preferred for purposes of manufacturing efficiency.

Figure 4:
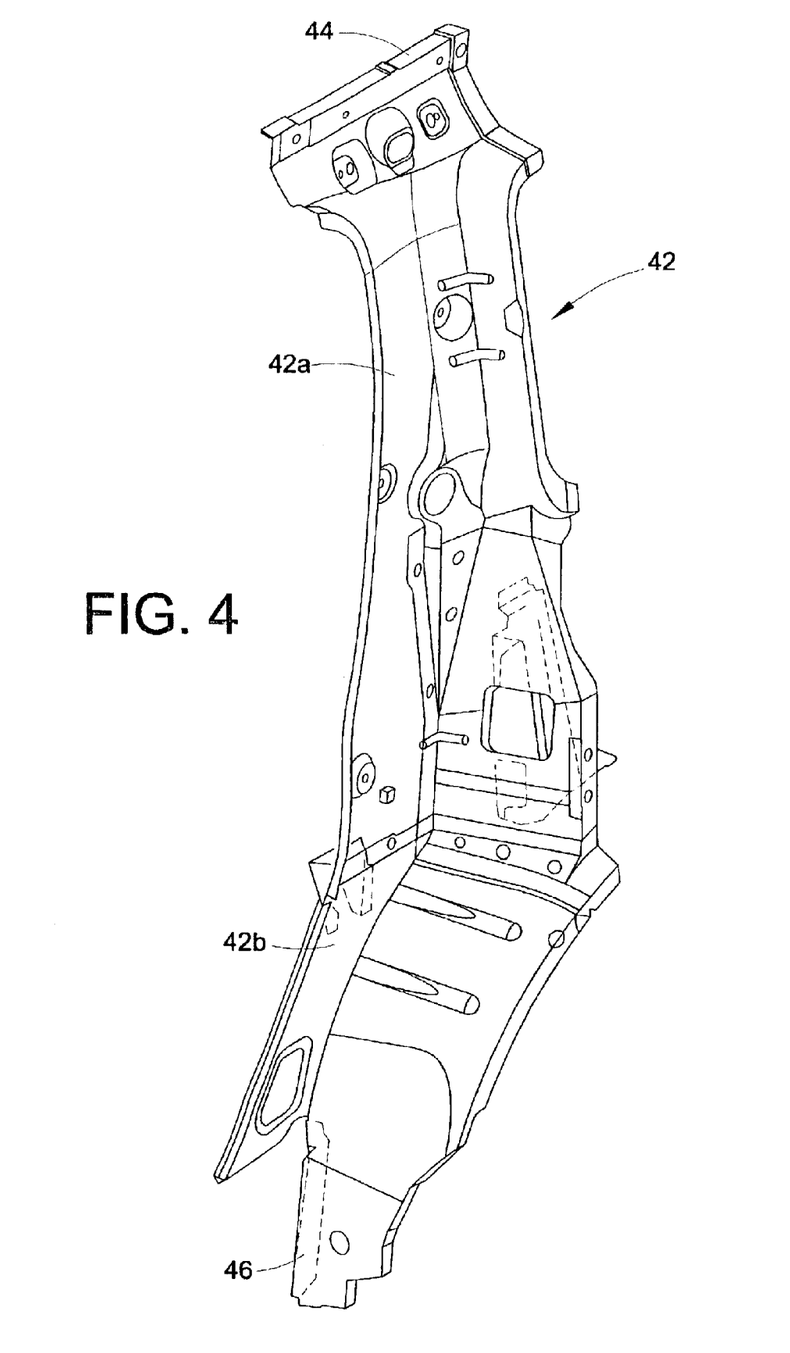
FIG. 4 is a perspective view of an inner reinforcement member of the C-pillar.

The upper end 44 of the inner reinforcement member upper portion 42a is secured to the roof rail, whereas the lower end 46 of the inner reinforcement member lower portion 42b merges into and is secured to the rocker panel. The inner reinforcement member 42 further supports an interior garnish member 48 (FIG. 7) that is disposed on an interior of the vehicle 10, as will be apparent from the following disclosure.

Figure 5:
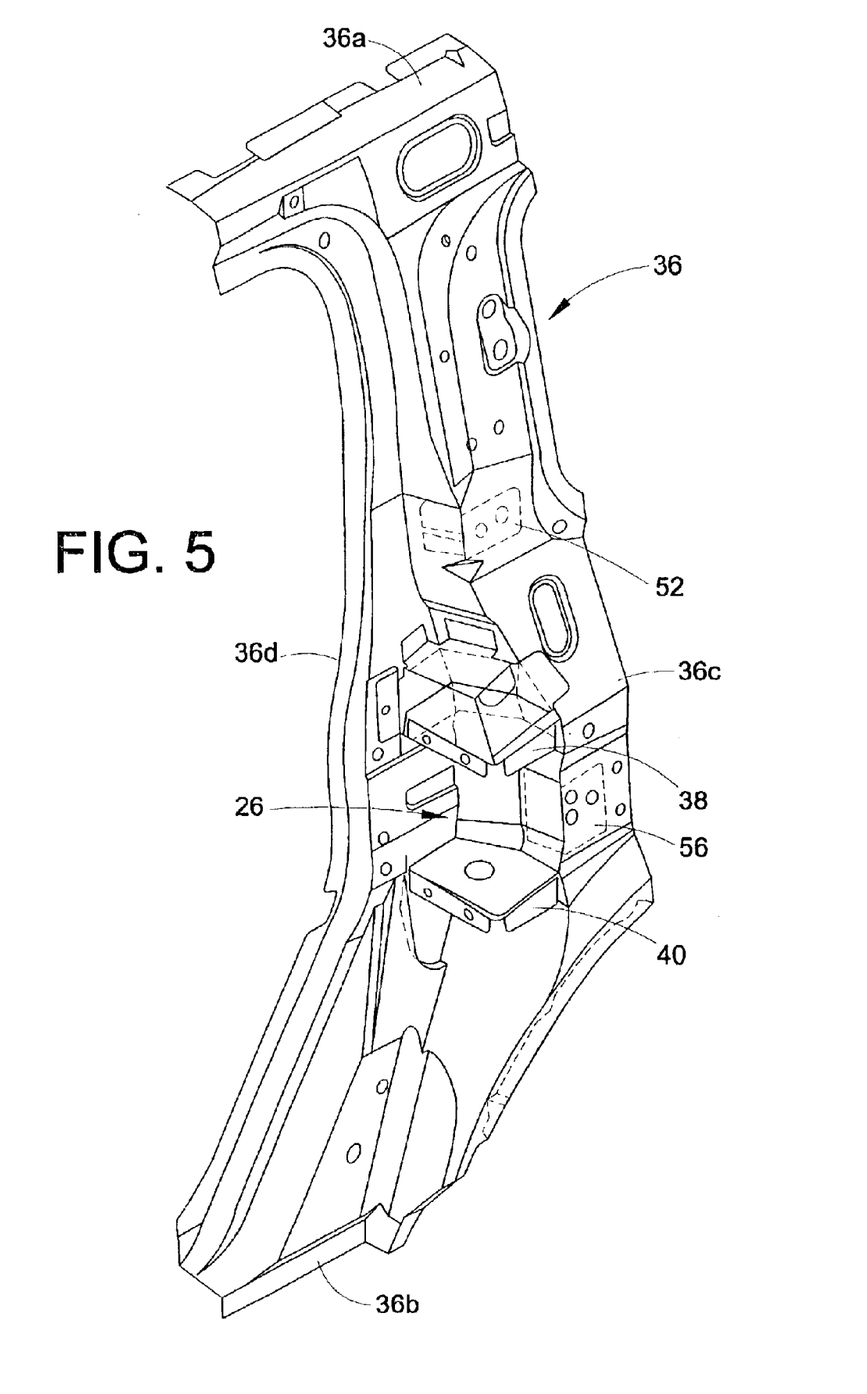
FIG. 5 is a perspective view of an outer reinforcement member of the C-pillar.

The outer reinforcement member 36 is illustrated in FIG. 5. The outer reinforcement member 36 is preferably formed as one piece from sheet metal in one or more stamping or forming steps. An upper end 36a of the outer reinforcement member 36 overlies the upper end 44 of the inner reinforcement member upper portion 42a and is likewise secured to the roof rail. The outer reinforcement member upper end 36a extends forward and rearward further than the upper end 44 of the inner reinforcement member 42. The roof garnish 30 is preferably secured over the outer reinforcement member upper end 36a. The lower portion 36b of the outer reinforcement member 36 extends downwardly toward and over the rocker panel. Accordingly, the C-pillar 18 defined by the outer and inner reinforcement members 36, 42 extends between the rocker panel and the roof rail and effectively links or integrates the structural assembly defining a rearward extent of the door opening with the upper and lower structural assemblies defining the upper and lower extents of the door opening.

As will be appreciated from the following, the inner and outer reinforcement members 42, 36 are secured to one another, such as by welding, at or adjacent their peripheral edges, while intermediate portions of the inner and outer reinforcement members 42, 36 are spaced from one another so as to define, in cross-section, an integrated, box-like structure for the C-pillar 18. Spacing the inner and outer reinforcement members in this manner, the strength or stiffness of the C-pillar 18 is increased as compared to reinforcement members that fit tightly or otherwise closely conform to one another.

A rearward portion of the outer reinforcement member 36 defines a flange 36c that, along at least some of its length, is preferably coincident with, and secured to, the underlying portion of the inner reinforcement member 42. On the laterally opposite side of the outer reinforcement member, a curved peripheral edge 36d defines the shape of a portion of the rear door opening. This peripheral edge 36d may be covered by an edge garnish (not shown), which may be independent of the outer garnish member 28 and interior garnish member 48, described hereinbefore, and against which the rear door 14 seals. Alternatively, the edge garnish may be integrally provided by one of the interior and outer garnish members 48, 28.

The outer reinforcement member 36 defines a recessed portion in which the upper and lower brackets 38, 40 are disposed. The upper and lower brackets 38, 40 cooperate with the recessed portion to define the hinge pocket 26 that receives the lower hinge assembly 20. Moreover, the upper and lower brackets 28, 40 underlie and support the outer garnish member 28, which serves to conceal the hinge pocket 26 from view, as discussed hereinbefore. The outer reinforcement member 36 further provides an upper mounting location 52 to which is mounted a first upper hinge bracket 54 (FIG. 7) of the upper hinge assembly 22, and a lower mounting location 56 to which is mounted a first lower hinge bracket 58 (FIG. 8) of the lower hinge assembly 20, described further hereinafter. The upper mounting location is disposed slightly rearward of the rear door 14 while the lower mounting location 56 is disposed at a location in alignment with, but rearward of, the hinge pocket 26, as illustrated.

Figure 6:
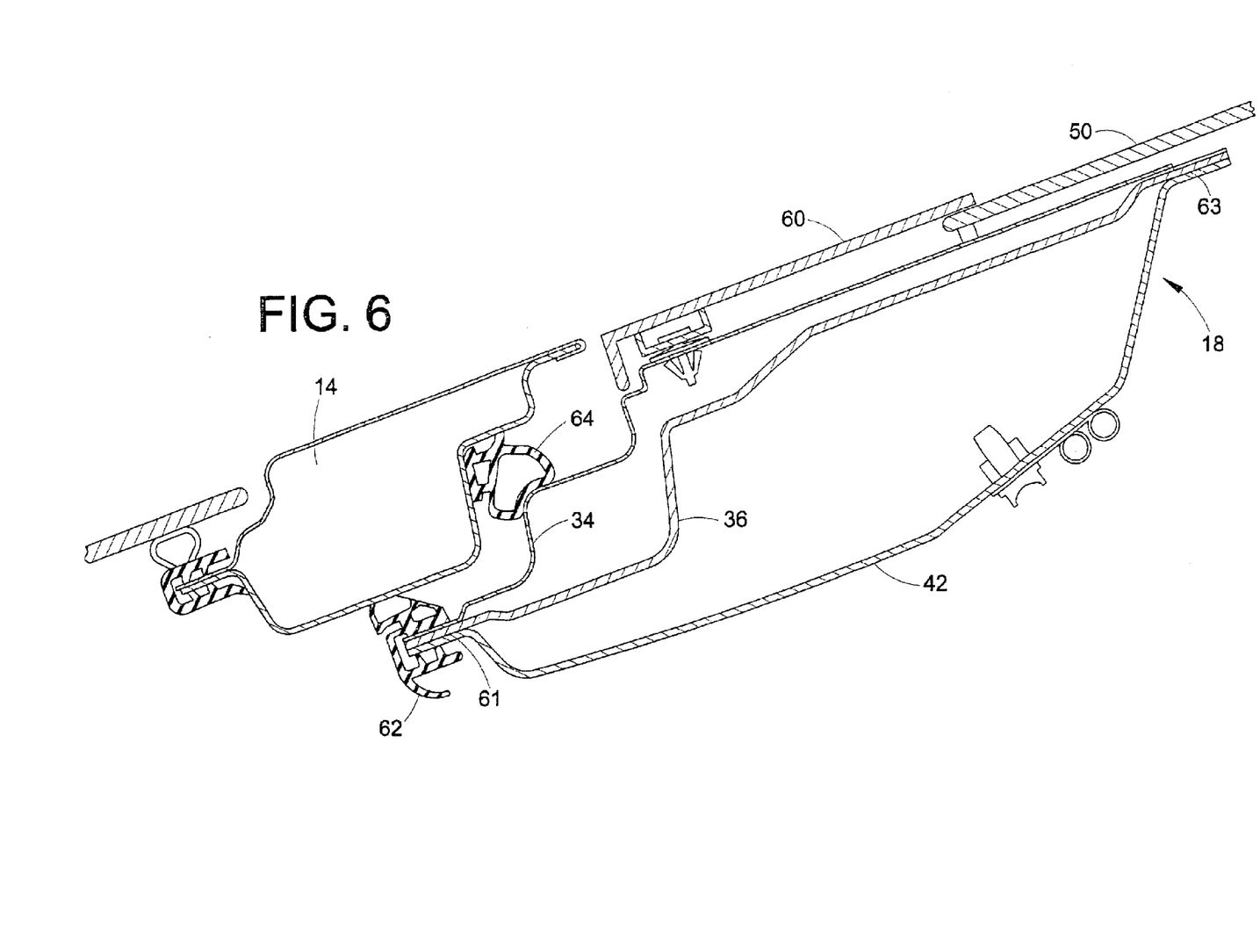
FIG. 6 is a cross-sectional view through the C-pillar and rear door.

FIG. 6 illustrates a cross section through the rear door 14 and the C-pillar 18 at a location above the upper mounting location 52. As shown, the outer body panel 34 of the vehicle 10 has an outer panel 60 secured thereto that assists in holding the rear window 50 in place. At a forward edge 61, which surrounds the door opening, the outer body panel 34 is attached to the outer reinforcement member 36 and the inner reinforcement member 42. A first sealing member 62 is secured over the forward edge 61 and seals against the rear door 14, while a second sealing member 64 secured to the inner surface of the rear door 14 seals against the outer body panel 34 between the forward edge 61 and the outer panel 60, as illustrated.

The outer body panel 34 overlies the outer reinforcement member 36 and, except for its forward edge 61 and rearward edge 63, is spaced from the outer reinforcement member 36, as illustrated. The outer reinforcement member 36 is likewise spaced from the inner reinforcement member 42, except at the forward and rearward edges 61, 63 thereof in which the inner and outer reinforcement members are integrally secured to one another and to the outer body panel 34. Accordingly, the inner and outer reinforcement members 42, 36 cooperate to define a generally box-shaped C-pillar 18. The outer body panel 34, due to its spacing from the outer reinforcement member 36, also assists in stiffening the C-pillar 18.

Figure 7:
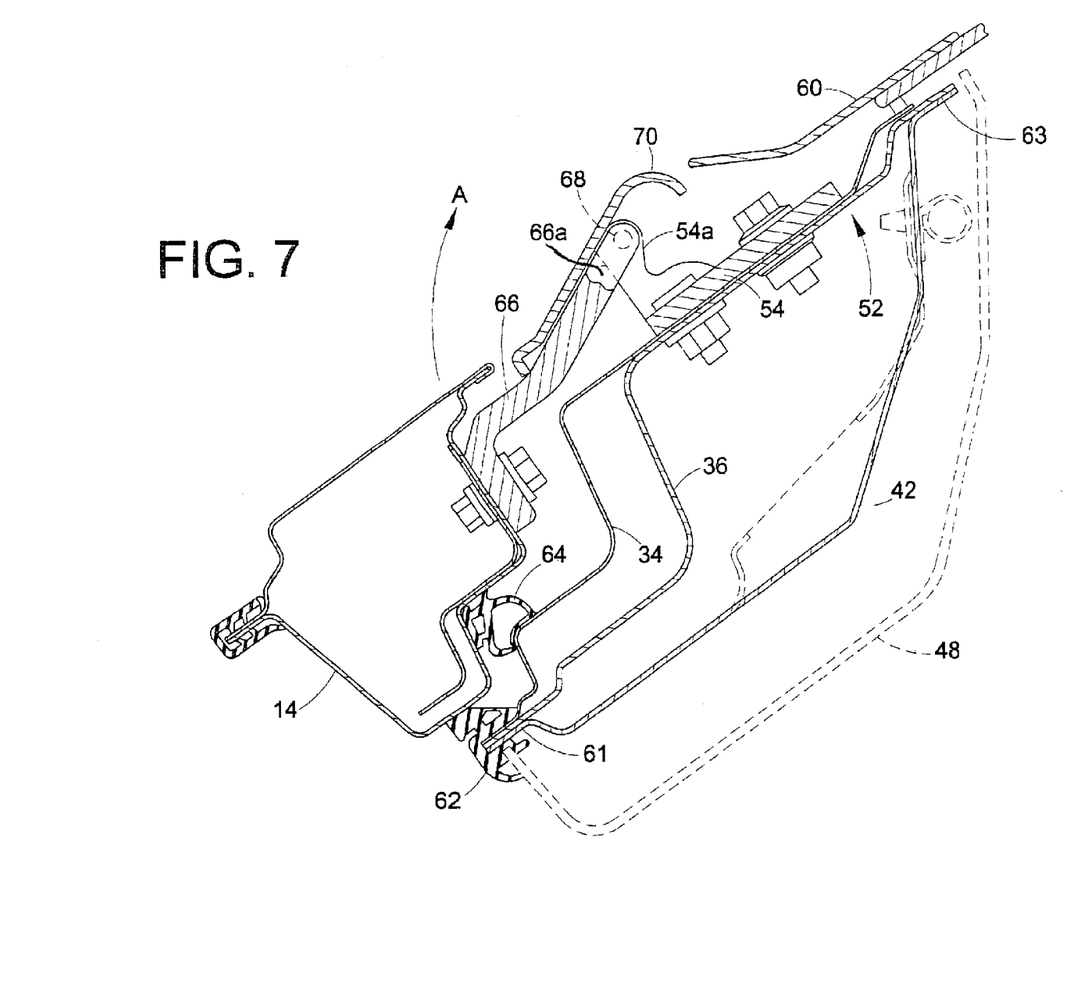
FIG. 7 is a cross-sectional view through the C-pillar and rear door at an upper hinge assembly; and, FIG. 8 is a cross-sectional view through the C-pillar and rear door at a lower hinge assembly.

FIG. 7 illustrates a section through the C-pillar 18 and the rear door 14 at the upper hinge assembly 22. The upper hinge assembly 22 includes the first upper hinge bracket 54, which is secured to the outer body panel 34 and outer reinforcement member 36 at the upper mounting location 52, as well as a second upper hinge bracket 66, which is secured to the rear door 14. Each of the first and second upper hinge brackets 54, 66 includes one or more interleaved fingers 54a, 66a, respectively, that cooperate to receive one or more upper hinge pins or pintles 68 about which the rear door 14 pivots.

The second upper hinge bracket 66 has a cover plate 70 secured thereto. The cover plate 70 is disposed and visible on the exterior of the vehicle 10 (FIG. 1) and serves to mute the exterior appearance of the upper hinge assembly 22. When the rear door 14 is pivoted about the upper pintle(s) 68 toward the open position (i.e. in the direction of arrow A), the cover plate 70 and second upper hinge bracket 66 move together as a unitary structure with the rear door 14. As the door 14 is opened to the full open position (FIG. 2), the rearward edge of the cover plate moves underneath the raised peripheral edge of the outer panel 60 and toward the C-pillar. Nevertheless, the illustrated and preferred upper hinge assembly 22 is adapted to permit the rear door 14 to open fully (i.e., 90°).

Figure 8:
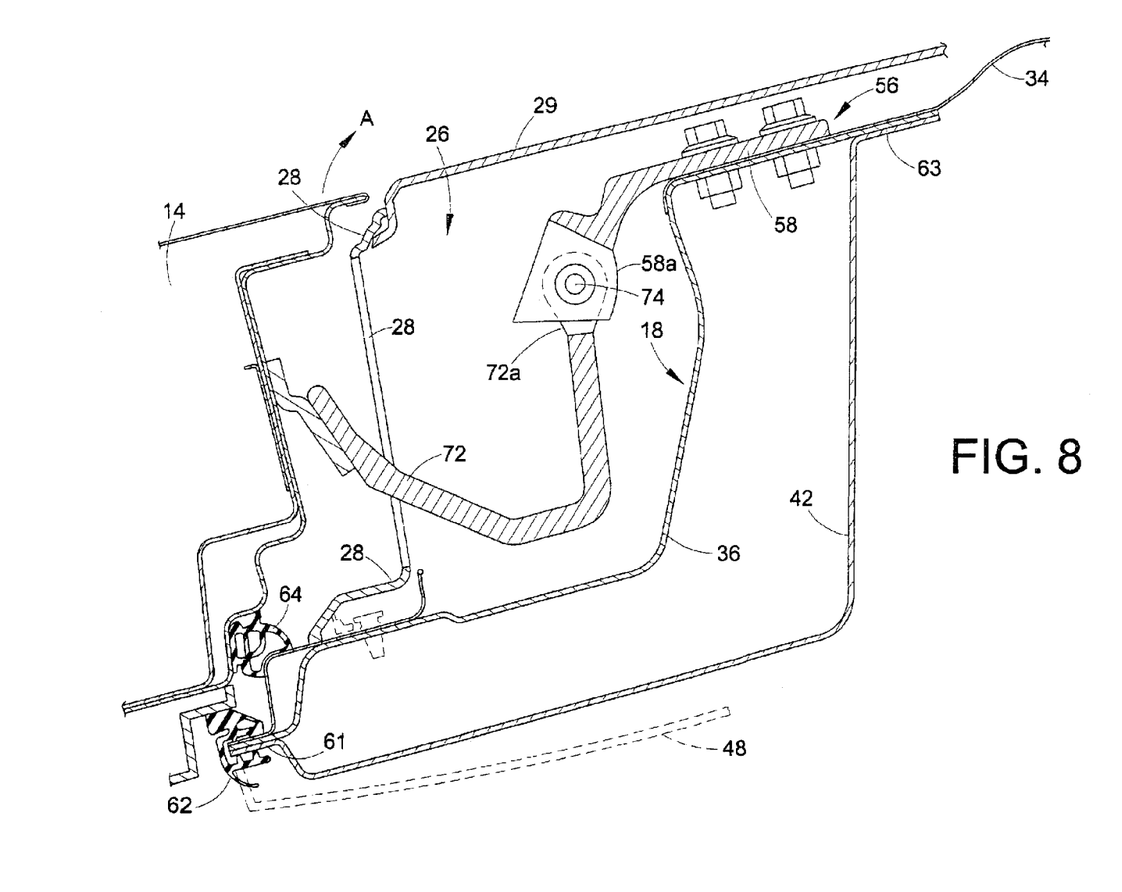

FIG. 8 illustrates a section through the C-pillar 18 and the rear door 14 at the lower hinge assembly 20. The lower hinge assembly 20 includes the first lower hinge bracket 58, which is secured to the outer body panel 34 and outer reinforcement member 36 at the lower mounting location 56, as well as a second lower hinge bracket 72, which is secured to the rear door 14. Each of the first and second lower hinge brackets 58, 72 include one or more interleaved fingers 58a, 72a, respectively, that cooperate to receive one or more lower hinge pins or pintles 74 about which the rear door 14 pivots.

As illustrated, the second lower hinge bracket 72 has a curved shape that permits it, when the rear door is closed, to be received within the hinge pocket 26 and that permits the rear door to pivot from the illustrated closed position into a full open position (FIG. 2). The lower body panel garnish 29 conceals or covers the lower mounting location 56 and the laterally facing portion of the hinge pocket 26, as illustrated. The forwardly facing side of the hinge pocket 26 is covered by the outer garnish member 28. Naturally, the outer garnish member 28 includes a slotted opening 76 extending across the width thereof through which the second lower hinge bracket 72 extends. The outer garnish member 28 overlies the upper and lower brackets 38, 40, and is preferably secured to at least one of the brackets 38, 40.

Accordingly, the present invention provides a C-pillar assembly including the C-pillar (outer and inner reinforcement members 36, 42), lower and upper hinge assemblies 20, 22, and outer garnish member 28 that connects or links the roof rail to the rocker panel and thereby defines a stiff support that resists lateral deformation. Further, the C-pillar assembly is constructed to provide increased support for the rear door 14 during opening and closing. The position and construction of the upper and lower hinge assemblies 22, 20 are specially selected to permit the rear door 14 to be opened fully relative to the vehicle 10.

While the preferred embodiment of the present invention has been described herein with particularity, it is considered apparent that the present invention is capable of numerous modifications, substitutions, and rearrangements of parts and, therefore, the present invention is not to be limited to that specifically shown and described herein. Rather, the present invention is only defined by the claims appended hereto, including equivalents thereof.

What is claimed is:

1. A C-pillar assembly for a vehicle, comprising:
an inner reinforcement member extending between a roof rail and a rocker panel,
an outer reinforcement member extending between the roof rail and the rocker panel and disposed over said inner reinforcement member and defining a recessed portion that receives an upper bracket and a lower bracket, said upper and lower brackets cooperating with said outer reinforcement member to define a hinge pocket, said inner and outer reinforcement members being secured to one another so as to define a C-pillar having, in cross section, a generally box-like shape along at least a portion of a length of said C-pillar; and,
wherein said outer reinforcement member provides an upper mounting location for an upper hinge assembly and a lower mounting location for a lower hinge assembly.

2. The C-pillar assembly according to claim 1, wherein said lower mounting location is disposed generally rearward of said hinge pocket.

3. The C-pillar assembly according to claim 2, wherein at least a portion of said lower hinge assembly is disposed in said hinge pocket.

4. The C-pillar assembly according to claim 2, wherein said upper hinge assembly includes a first upper hinge bracket secured to said outer reinforcement member at said upper hinge mounting location, and a second upper hinge bracket secured to a rear door of said vehicle.

5. The C-pillar assembly according to claim 4, wherein said upper hinge mounting location is disposed generally rearwardly of the door.

6. The C-pillar assembly according to claim 1, wherein said lower hinge assembly includes a first lower hinge bracket secured to said outer reinforcement member at said lower hinge mounting location, and a second lower hinge bracket secured to a rear door of said vehicle.

7. The C-pillar assembly according to claim 6, wherein said second lower hinge bracket is disposed within said hinge pocket when the door is closed, and projects from said hinge pocket when the door is opened.

8. The C-pillar assembly according to claim 6, wherein said upper hinge assembly includes a first upper hinge bracket secured to said outer reinforcement member at said upper hinge mounting location, and a second upper hinge bracket secured to a rear door of said vehicle.

9. The C-pillar assembly according to claim 8, wherein said upper hinge mounting location is disposed generally rearwardly of the door.

10. The C-pillar assembly of claim 1, wherein said hinge pocket is adapted to receive said lower hinge assembly.

11. The C-pillar assembly according to claim 10 wherein the upper mounting location id positioned above the lower edge of the rear window of the vehicle.

12. A C-pillar assembly for a vehicle, comprising:

an inner reinforcement member;

an outer reinforcement member disposed over said inner reinforcement member, said inner and outer reinforcement members being secured to one another such so as to define a C-pillar having, in cross section, a generally box-like shape along at least a portion of a length of said C-pillar;

an upper hinge assembly;

a lower hinge assembly; and, an outer garnish member;

wherein said outer reinforcement member has an upper mounting location to which the upper hinge assembly is secured and a lower mounting location to which the lower hinge assembly is secured, and wherein said outer garnish member is secured to said outer reinforcement member and said lower hinge assembly extends therethrough.

13. The C-pillar assembly according to claim 12, wherein said outer reinforcement member defines a recessed portion that receives an upper bracket and a lower bracket, said upper and lower brackets cooperating with said outer reinforcement member to define a hinge pocket.

14. The C-pillar assembly according to claim 13, wherein said lower mounting location is disposed generally rearward of said hinge pocket.

15. The C-pillar assembly according to claim 14, wherein at least a portion of said lower hinge assembly is disposed in said hinge pocket.

16. The C-pillar assembly according to claim 14, wherein said upper hinge assembly includes a first upper hinge bracket secured to said outer reinforcement member at said upper hinge mounting location, and a second upper hinge bracket secured to a rear door of said vehicle.

17. The C-pillar assembly according to claim 16, wherein said upper hinge mounting location is disposed generally rearwardly of the door.

18. The C-pillar assembly according to claim 13, wherein said lower hinge assembly includes a first lower hinge bracket secured to said outer reinforcement member at said lower hinge mounting location, and a second lower hinge bracket secured to a rear door of said vehicle.

19. The C-pillar assembly according to claim 18, wherein said second lower hinge bracket is disposed within said hinge pocket when the door is closed, and projects from said hinge pocket when the door is opened.

20. The C-pillar assembly according to claim 18, wherein said upper hinge assembly includes a first upper hinge bracket secured to said outer reinforcement member at said upper hinge mounting location, and a second upper hinge bracket secured to a rear door of said vehicle.

21. The C-pillar assembly according to claim 20, wherein said upper hinge mounting location is disposed generally rearwardly of the door.

22. The C-pillar assembly according to claim 21, wherein said outer garnish member defines a slotted opening through which said second lower hinge bracket extends.

23. A C-pillar assembly for a vehicle, comprising:

an inner reinforcement member extending between a roof rail and a rocker panel, an outer reinforcement member extending between the roof rail and the rocker panel and disposed over said inner reinforcement member, said inner and outer reinforcement members being secured to one another so as to define a C-pillar having, in cross section, a generally box-like shape along at least a portion of a length of said C-pillar; and, wherein said outer reinforcement member provides:

an upper mounting location for an upper hinge assembly;

a lower mounting location for a lower hinge assembly; and a hinge pocket positioned inline and forward of the lower mounting location for receipt of the lower hinge assembly mountable in the lower mounting location.

24. The C-pillar assembly according to claim 23 wherein the hinge pocket is defined in combination by a recessed portion as well as upper and lower brackets of the outer reinforcement member.

* * * * *